US009796852B2

(12) United States Patent
Martin et al.

(10) Patent No.: US 9,796,852 B2
(45) Date of Patent: Oct. 24, 2017

(54) BITUMEN

(71) Applicant: S.A. Imperbel N.V., Lot (BE)

(72) Inventors: Caroline Martin, Perwez (BE); Placido Caruso, Perwez (BE); Hans Aerts, Lot (BE)

(73) Assignee: S.A. Imperbel N.V., Lot (BE)

( * ) Notice: Subject to any disclaimer, the term of this patent is extended or adjusted under 35 U.S.C. 154(b) by 366 days.

(21) Appl. No.: 14/323,223

(22) Filed: Jul. 3, 2014

(65) Prior Publication Data

US 2015/0008156 A1 Jan. 8, 2015

(30) Foreign Application Priority Data

Jul. 4, 2013 (EP) ...................................... 13175198

(51) Int. Cl.
| | |
|---|---|
| *C08L 95/00* | (2006.01) |
| *C10M 175/00* | (2006.01) |
| *C10C 3/00* | (2006.01) |
| *C08L 91/00* | (2006.01) |
| *C08K 3/26* | (2006.01) |
| *C08K 3/22* | (2006.01) |

(52) U.S. Cl.
CPC ............. *C08L 95/00* (2013.01); *C08L 91/00* (2013.01); *C10C 3/005* (2013.01); *C10M 175/00* (2013.01); *C08K 2003/2227* (2013.01); *C08K 2003/265* (2013.01); *C08L 2555/34* (2013.01); *C08L 2555/84* (2013.01); *C08L 2555/86* (2013.01)

(58) Field of Classification Search
CPC ...................................................... C08L 95/00
USPC ................. 208/22, 23; 106/273.1–284.4
See application file for complete search history.

(56) References Cited

U.S. PATENT DOCUMENTS

| | | | | |
|---|---|---|---|---|
| 5,143,597 A | * | 9/1992 | Sparks | .................... C10B 55/00 208/131 |
| 5,340,391 A | | 8/1994 | Grzybowski | |
| 5,447,628 A | * | 9/1995 | Harrison | .......... C10M 175/0075 208/179 |
| 5,836,524 A | * | 11/1998 | Wang | ........................ C10B 7/10 241/23 |
| 5,904,760 A | * | 5/1999 | Hayner | ................... C08L 95/00 106/279 |
| 6,048,447 A | * | 4/2000 | Hayner | ................... C08L 95/00 106/274 |
| 6,186,700 B1 | * | 2/2001 | Omann | ................... C04B 26/26 404/79 |
| 6,588,973 B1 | * | 7/2003 | Omann | ................... C04B 26/26 404/17 |
| 7,067,050 B2 | * | 6/2006 | Kiser | ........................ C10C 3/00 208/22 |
| 8,133,316 B2 | * | 3/2012 | Poncelet | ................. C08L 95/00 106/273.1 |
| 8,206,500 B1 | | 6/2012 | Mathis | |
| 8,382,362 B2 | * | 2/2013 | Omann | ................... C08L 95/00 366/24 |
| 8,864,981 B2 | * | 10/2014 | Chang | .................... C10G 21/16 208/19 |
| 9,284,497 B2 | * | 3/2016 | Bourane | ................. C10G 9/36 |
| 9,315,733 B2 | * | 4/2016 | Koseoglu | ................. C10C 3/00 |
| 2004/0007499 A1 | | 1/2004 | Aramburu | |
| 2011/0094937 A1 | * | 4/2011 | Subramanian | ....... C10G 21/003 208/40 |
| 2015/0166903 A1 | * | 6/2015 | Raman | .................... C08L 95/00 208/22 |
| 2016/0045841 A1 | * | 2/2016 | Kaplan | ................ B01J 19/0093 429/49 |

OTHER PUBLICATIONS

CMR substances from Annex VI of the CLP Regulation. May 31, 2012, http://echa.europa.eu/documents/10162/13562/cmr_report_en.pdf.

* cited by examiner

*Primary Examiner* — Ellen McAvoy
(74) *Attorney, Agent, or Firm* — Jacobson Holman PLLC

(57) ABSTRACT

A bitumen having the properties of a Newtonian liquid is a mixture of a first oil pitch made of particles of soot and saturated oils and a second oil pitch made of aromatic oils and resins, characterized in that the first oil pitch has saturated oils at a content of at least 10% in wet weight and the second oil pitch has aromatic oils at a content of at least 10% in wet weight.

14 Claims, No Drawings

BITUMEN

The present invention relates to bitumen.

Bitumen is a very complex material which can be obtained by different kind of processes treating crude oil. Depending on the origin of crude oil and on the process applied, several kinds of bitumen can be obtained with different properties in terms of viscosity, penetrability, shelf life and softening point. For example, a bitumen produced by a crude oil coming from Venezuela, Middle East or Mexico will have different physical properties, which also depend on the kind of process applied for producing the bitumen.

Generally, bitumen is produced during the refining of crude oil. The refining of crude oil comprises two steps. The first step consists to realize an atmospheric distillation in a first fractionating column to produce mainly liquefied petroleum gas, gasoline and kerosene. The second step consists in realizing a distillation under vacuum in a second column for producing gasoil and distillates. The bottom fraction recovered at the output of the second column can be processed according to a deasphalting process or by distillation to separate the lubricants from the bitumen. The deasphalting process corresponds to a physical separation of the remaining components of crude oil by using solvents. Indeed, this step is based on the different solubility of the remaining components of crude oil. Depending on the kind of solvent used (butane or propane), for realizing said separation step, the obtained bitumen will have different physical properties. On the opposite, the distillation of the obtained bottom fraction consists in cracking the crude oil to obtain bitumen on one hand and lubricants on the other hand.

For these reasons, the bitumen will have properties which will depend on the origin of crude oil and on the process applied to produce it.

When bitumen is produced according to the aforementioned process comprising the first and second distillation steps, it has a crystalline structure corresponding to a sol. It is known that a chromatography technique such as Latroscan®, thin-layer chromatography, can separate bitumen into four fractions of oils to reveal the existence of four families: Saturated oils, Aromatic oils, Resins and Asphaltenes (SARA). Asphaltenes are the most polar molecules with respect to aromatic oils, resins and saturated oils. Saturated oils, aromatic oils and resins are non polar molecules. Generally, industrial bitumen with a sol structure comprises around 11% by wet weight of saturated oils, around 55% by wet weight of aromatic oils, around 18% by wet weight of resins and around 15% by dry weight of asphaltenes. Such a bitumen is preferably modified with a polymer, preferably atactic polypropylene. The bitumen obtained by distillation has a crystalline phase where the asphaltenes has been peptised by resins leading to the formation of micelles; the saturated oils and aromatic oils form inter-micellar phases. So, the asphaltenes are like a core surrounded by the inter-micellar phases. This crystalline structure of bitumen corresponds to a sol having the properties of a Newtonian liquid.

It has been established that the nature of the structure of bitumen is predicted by an empiric relation corresponding to the proportion between the four types of families (SARA):

$$\frac{x_{saturated\ oils} + x_{asphaltenes}}{x_{aromatic\ oils} + x_{resins}} = \text{Colloidal stability index}$$

wherein $x_i$ is the mass fraction for each compound and where the colloidal stability index (%) enables to determine the nature of the colloidal structure of the bitumen.

The skilled person is aware that if the sum of the proportions of saturated oils and asphaltenes are inferior to the sum of the amount of the aromatic oils and resins, the bitumen will have a sol structure with Newtonian properties. On the opposite, the crystalline structure of bitumen will correspond to a gel structure where the asphaltenes are in a larger amount with respect to the amount of asphaltenes in a sol. The viscosity of bitumen is therefore higher in a gel structure in comparison with a sol because the amount of asphaltenes is higher with respect to the amount of asphaltenes in a sol structure. According to the crystalline phase of the bitumen, the latter will be defined either by a sol having the properties of Newtonian liquid or a gel having the properties of a non Newtonian liquid. The Newtonian liquid has such a viscosity that it can resist for example to shearing forces that are applied to bitumen. However, the Newtonian liquids are more susceptible, for example to variations of temperature. The sol and gel structures are the two extreme states of the bitumen. All the intermediate states between these two extremes also exist, where the bitumen has other properties in intermediate states.

A bitumen having a sol structure, recovered as a bottom fraction in the fractioned column under vacuum, can be convert into a gel structure by applying an oxidation process, or air blowing. The latter consists to pass air through the heated bitumen to raise an appropriate viscosity of the bitumen. This process produces a bitumen with a maintained flexibility when it is used, at an ambient temperature. When the bitumen is processed by air blowing, its viscosity is modified and the equilibrium mentioned above is therefore different. More precisely, the sum of the proportions of the saturated oils and asphaltenes are greater to the one of the aromatic oils and resins. The colloidal structure is therefore a gel structure where the amount of asphaltenes in the bitumen is doubled with respect to the initial quantity of asphaltenes in the sol structure.

A bitumen can also be modified by mixing it with a polymer to form a modified bitumen. In this process, the bitumen is preferably a bitumen with a sol structure. The addition of a polymer to bitumen will lead to a phase inversion when the amount of the polymer will be sufficient to obtain the phase inversion corresponding to the formation of a polymeric matrix wherein bitumen is retained. When the inversion phase occurs, the bitumen having the behaviour of a Newtonian liquid will have the properties of a viscoelastic fluid.

The polymer and the bitumen have particular chemical interactions. The polymer forms a continuous phase (polymeric matrix) and the bitumen forms a dispersed phase. When the phase inversion occurs, the bitumen is retained into the polymeric matrix giving the adequate viscoelastic properties and the stability to the composition comprising the bitumen and the polymer. Such a modified bitumen can be used for manufacturing a waterproofing membrane having an appropriate flexibility which is an advantageous criteria, for example when the waterproofing membrane is applied on a roof. The phase inversion phenomenon depends on the ratios of the polymer and the bitumen in the composition.

Consequently, the origin of the bitumen, the process applied to produce the bitumen and the subsequent processes to treat it will confer to it the requested properties to meet the requirements imposed by a field of technology. Indeed, the bitumen can be used in the manufacturing of mastics, waterproofing products, preferably waterproofing membranes, in industry and in buildings.

Currently, it is preferable for economical reasons to decrease as much as possible the use of bitumen, obtained during the refining of crude oil, in the aforementioned fields of application.

It is an object of the present invention to provide an alternative to bitumen, produced during the refining of crude oil.

To solve this problem, the invention provides a bitumen, characterized in that said bitumen is a mixture of a first oil pitch comprising particles of soot and saturated oils and a second oil pitch comprising Heavy Pyrolysis Oil (HPO), aromatic oils and resins.

The first oil pitch is a residue originating from a distillation of a waste engine lubricant and comprises particles of soot and saturated oils. These particles of soot are a residue, amorphous carbon and are produced by the incomplete combustion of hydrocarbons. The gas phase soots may comprise polycyclic aromatic hydrocarbons (PAHs). The first oil pitch has a high needle penetration which can be estimated above 500 dmm at 60° C.

The second oil pitch used in the present invention comprises Heavy Pyrolysis Oil (HPO) having a CAS number of 64742-90-1. Said second oil pitch has a low needle penetration which can be estimated around 25 dmm at 60° C. For this reason, this second oil pitch is not used in industries but only as fuels or for naphthalene extraction. It can also be burned as fuel in the chemical plant where it is produced. The second oil pitch comprises also aromatic oils and resins.

The particular choice of the first and second oil pitches of the present invention allows to produce a bitumen having similar properties to bitumen obtained from cracking crude oil. The first oil pitch and the second oil pitch are both residues of which there is no teaching to use them for manufacturing bitumen.

The first oil pitch comprising mainly saturated oils has a high needle penetration which can be estimated above 500 dmm at 60° C. and the second oil pitch has a needle penetration around 25 dmm at 60° C.

For these reasons, the person skilled in the art will not envisage to select the first oil pitch and the second oil pitch to create a bitumen since the first and second oil pitches have not an appropriate needle penetrability to form a mixture capable of replacing bitumen from crude oil origin.

Surprisingly, the combination of the first and second oil pitches leads to the formation of a bitumen which has similar or even improved properties to bitumen from crude oil origin. The first and second oil pitches act synergistically because the asphaltenes are mainly provided by the first oil pitch and the second oil pitch creates the inter-micellar phases which surround the core made of asphaltenes. This phenomenon allows to create a crystalline structure of a sol with a viscosity, density and needle penetration which are comparable to bitumen from crude oil origin.

The bitumen according to the present invention is preferably a bitumen having a crystalline structure of a sol because it has the properties of a Newtonian liquid which is more convenient to process.

Advantageously, the first oil pitch is present at a content of 15-75% by wet weight with respect to the total mass of said bitumen and the second oil pitch is present at a content of 85-25% by wet weight with respect to the total mass of said bitumen.

Advantageously, the first oil pitch is present at a content of 20-50% by wet weight with respect to the total mass of said bitumen and the second oil pitch is present at a content of 80-50% by wet weight with respect to the total mass of said bitumen.

More advantageously, the first oil pitch is present at a content of 25-45% by wet weight with respect to the total mass of said bitumen and the second oil pitch is present at a content of 75-55% by wet weight with respect to the total mass of said bitumen. This preferred embodiment is advantageous when bitumen is modified with a polymer because the phase inversion occurs at 15%, corresponding to the amount in wet weight of the polymer in the bitumen.

More preferably, the first oil pitch comprises saturated oils at a content of at least 10% in wet weight and said second oil pitch comprises aromatic oils in an amount of at least 10% in wet weight.

Particularly, the first oil pitch of the present invention comprises saturated oils at a content of at least 15% in wet weight, more preferably at least 20% in wet weight, particularly at least 30% in wet weight, more particularly at least 40% in wet weight and said second oil pitch comprises aromatic oils in an amount of at least 15% in wet weight, more preferably at least 20% in wet weight, particularly at least 30% in wet weight; and resins in an amount of at least 10% in wet weight, preferably at least 15% in wet weight, more preferably at least 20% in wet weight, particularly at least 30% in wet weight, more particularly at least 40% in wet weight. The fact that the first and the second oil pitches are present at a content comprised in one of the aforementioned range of values enables to provide a bitumen having improved properties with respect to bitumen originating from crude oil. For example, the phase inversion occurs with a reduced amount of polymer with respect to a modified bitumen wherein bitumen is originated from crude oil.

More particularly, said first oil pitch comprises at least 30% in wet weight of saturated oils, at least 10% in wet weight of aromatic oils, at least 15% in wet weight of resins and at least 15% in dry weight of asphaltenes, and said second oil pitch comprises at least 3% in wet weight of saturated oils, at least 35% in wet weight of aromatic oils, at least 30% in wet weight of resins and at least 2% in dry weight of asphaltenes.

In a particularly preferred embodiment of the present invention, the bitumen further comprises a bituminous roof waste which is present in an amount between 0.5-70% in dry weight of the total mass of the bitumen, said bituminous roof waste comprising a first polymer in an amount situated between 0.5-30% in dry weight, preferably 0.5-25% in dry weight, more preferably 2-20% in dry weight, particularly 4-15% in dry weight, more particularly 10-15% in dry weight, preferably 7% in dry weight of the total mass of the bitumen.

This is particularly advantageous when bituminous roof waste have to be recycled. After several years of being applied on a roof, the waterproofing membrane arrives at the end of its life cycle. Consequently, the waterproofing membrane has to be recycled. So, the recycled bitumen will be obtained from the bituminous roof waste. This will later be used in the bitumen of the present invention in order to further reduce the use of bitumen from crude oil origin.

Advantageously, said bituminous roof waste is chosen in the group consisting of bituminous roof waste which are recycled after being applied on a roof or a bituminous roof waste coming from a production industry. Preferably, the bituminous roof waste of the present invention comprises atactic polypropylene and/or poly(styrene-butadiene-styrene).

Preferably, the bitumen comprises a second polymer in an amount between 0.5-30% in dry weight, preferably 0.5-25% in dry weight, more preferably 2-20% in dry weight, particularly 4-15% in dry weight, more particularly 10-15% in dry weight, preferably 7% in dry weight of the total mass of the bitumen. This particular embodiment allows to add a reduced amount of the second polymer since the bituminous roof waste already comprises a certain amount of the first polymer.

In a preferred embodiment, said first polymer and said second polymer are chosen in the group consisting of atactic polypropylene (APP), poly(styrene-butadiene-styrene) (SBS), styrene-ethylene/butylene-styrene (SEBS), styrene-ethylene/propylene-styrene (SEPS), dimethyl-gamma-butyrolactone acrylate (DBA), styrene-isoprene-styrene (SIS), ethylene-vinyl acetate (EVA), isotactic polypropylene (IPP), syndiotactic polypropylene (SPP) and their mixture.

In an advantageous embodiment, the bitumen comprises a filler chosen in the group consisting of calcium carbonate, preferably colemanite or aluminate trihydrate (ATH). The presence of fillers like colemanite or ATH allows to confer to the bitumen fire resistant properties.

Advantageously, said filler is present in an amount situated in a range of 0.5-30% in dry weight of the total mass of the bitumen.

In the meaning of the present invention, the first polymer and the second polymer can be the same one or can be different.

According to a particular embodiment of the present invention, the bitumen comprises saturated oils at a content of at least 10% in wet weight, aromatic oils at a content of at least 30% in wet weight, resins at a content of at least 10% in wet weight and asphaltenes at a content of at least 10% in dry weight. This is advantageous because the presence of the SARA compounds enables to provide a bitumen having similar properties with bitumen from crude oil origin.

The present invention relates also to a method for producing a bitumen, characterized in that the method comprises the mixing of a first oil pitch, comprising particles of soot and saturated oils, with a second oil pitch, comprising Heavy Pyrolysis Oil (HPO), aromatic oils and resins, said first oil pitch originating from a distillation of waste engine lubricant and said second oil pitch being a vacuum residue of crude oil, coming from a crude oil distillation process under vacuum.

Advantageously, the first oil pitch is mixed with the second oil pitch, respectively in an amount between 15-75% by wet weight with respect to the total mass of said bitumen and in an amount between 85-25% by wet weight with respect to the total mass of said bitumen.

Preferably, the first oil pitch is mixed with the second oil pitch, respectively in an amount between 20-50% by wet weight with respect to the total mass of said bitumen and in an amount between 80-50% by wet weight with respect to the total mass of said bitumen.

More preferably, the method further comprises:
determining of a quantity of the first polymer in the bituminous roof waste; and
addition of an amount of a second polymer to the bituminous roof waste when the quantity of said first polymer in said bituminous roof waste is lower than a predetermined value.

This particular embodiment allows to check if the bituminous roof waste comprises enough of the first polymer. When the amount of said first polymer is lower than a predetermined value, the addition of the second polymer to the bitumen is required. If the amount of the first polymer in the bitumen is already comprised in a predetermined range of values, the method does not necessarily require the addition of a polymer to the bitumen. The predetermined value or range of values is situated between 0.5-30% in dry weight, preferably 0.5-25% in dry weight, more preferably 2-20% in dry weight, particularly 4-15% in dry weight, more particularly 10-15% in dry weight, preferably 7% in dry weight of the total mass of the bitumen.

Preferably, the bitumen is used for manufacturing a recycled waterproofing membrane.

Other embodiments of the method according to the invention are mentioned in the description.

The bitumen of the present invention comprises a first oil pitch and a second oil pitch.

The term "pitch" is defined according to the present invention as a residue coming from a distillation process. Particularly, the kind of the distillation will define the nature of the residue. So, the second oil pitch is a vacuum residue since it comes from a distillation process carried out under vacuum.

According to the present invention, the terms "particles of soot" are defined as particles which are produced by the incomplete combustion of hydrocarbons leading to the formation of impure carbon particles. Particles of soot are a powder form of amorphous carbon and may comprise polycyclic aromatic hydrocarbons (PAHs).

According to the present invention, the term "HPO" is used for Heavy Pyrolysis Oil and has the following CAS number: 64742-90-1. HPO is defined as a residue obtained from crude oil.

According to the present invention, the terms "saturated oils", "aromatic oils", "resins" and "asphaltenes" are defined with respect to the Latroscan® method, which consists in the separation of the different families present in the bitumen of the present invention. This method uses an extraction solvent called n-heptane to form two fractions, the first fraction contains asphaltenes which are not soluble in n-heptane and the second fraction contains maltenes comprising saturated oils, aromatic oils and resins which form the soluble fraction in n-heptane. The separation between saturated oils, aromatic oils and resins from the second fraction is carried out by the application of a chromatography method which is based on the affinity of each compound for a particular solvent. So, n-heptane enables to elute saturated oils, toluene elutes aromatic oils and toluene or methanol elutes resins. This method separate the three compounds present in the second fraction.

Asphaltenes are polar aromatic materials and are defined as those components of bitumen insoluble in n-heptane. They have a molecular weight comprised between 1000 and 100000 g/mol.

Saturated oils are non polar molecules and are soluble in n-heptane. Saturated oils are, for example paraffins and/or naphtenes and have a molecular weight comprised between 300 and 500 g/mol.

Aromatic oils are non polar molecules and are soluble in n-heptane and have a molecular weight comprised between 300 and 2000 g/mol.

Resins refer to non polar compounds which are soluble in n-heptane. Resins are dispersing agents and have a molecular weight which can be comprised in the range of 500 to 50000 g/mol.

The first oil pitch of the present invention is, preferably a bottom fraction originating from a waste engine lubricant. More precisely, during the upcycling of waste engine lubricants, a distillation is performed during one of the several steps, depending on the process applied, and allows the production of a residue. The latter comprises particles of soot and saturated oils. It also comprises aromatic oils, resins and asphaltenes in a lower quantity with respect to the amount of saturated oils in said first oil pitch. The waste engine lubricant can be upcycled according to several processes which are well known in the art.

The upcycling of a waste engine lubricant allows to produce a base oil, which is then used as a raw material to create an engine lubricant by adding to it the appropriate additives. There exists several upcycling process of waste engine lubricant allowing the production of the first oil pitch of the present invention. One of them consists to realize a dehydration step on a waste engine lubricant with an atmospheric distillation or under a partial vacuum to obtain dehydrated oils. The dehydration step enables to extract water and mainly naphtha fractions from the used oils. The residual oils (dehydrated oils) are then fed into a flash distillation unit wherein the temperature applied is situated between 320° C. and 540° C. During the flash distillation step a gasoil fraction is firstly sorted out and then a residue is recovered at the bottom of the column of distillation and contains essentially additives, particles of soot and heavy metals.

The particles of soot are not used for upcycling a waste engine lubricant because it is an unstable organic compound considered as an impurity. These particles of soot are a residue, amorphous carbon and are produced by the incomplete combustion of hydrocarbons. The gas phase soot may comprise polycyclic aromatic hydrocarbons (PAHs) which are particles that have to be separated from the additives.

Another example of upcycling waste oils also exists. So, the waste oils coming from chips, vessels or trucks are stored in a tank. After a first step of quality to determine the usefulness of the waste and after approval, the waste oils is then pumped to the production tanks wherein it is ready to be processed according to a refining process. The latter consists in pumping the waste oils in a distillation tank wherein three stages is carried out. Firstly, a water fraction and a petrol fraction, mainly naphtha, are distilled from the waste oils. Secondly, the heaviest gas oil is extracted from the waste oils. During this stage a residue is recovered as a bottom fraction and forms the first oil pitch of the present invention.

The second oil pitch of the present invention is a residue of crude oil which is coming from a crude oil distillation process under vacuum. More precisely, crude oil can be provided, for example from oil-tankers, tank trucks, tank wagons, vessels and it is then fed into a tank. Then, a combustion is carried out on the crude oil to crack it into several fractions into a vacuum-distillation. A bottom fraction is recovered at the bottom and forms a vacuum residue which comprises HPO, aromatic oils and resins. This residue can be the second oil pitch of the present invention.

The second oil pitch of the present invention is therefore a vacuum residue because it is originating from a distillation carried out under vacuum conditions. The second oil pitch of the present invention is obtained during a distillation under vacuum of crude oil producing a bottom fraction comprising Heavy Pyrolysis Oil (HPO), having the following CAS number: 64742-90-1. The second oil pitch has a low needle penetration, for example around 25 dmm at 60° C. For this reason, HPO is preferably burned as fuel in the chemical plant where it is produced. The second oil pitch comprises also aromatic oils and resins in a higher amount with respect to the quantity of saturated oils and asphaltenes.

An Latroscan® has been performed on each oil pitch of the present invention and the results are illustrated in table 1. The Latroscan® reveals that the first oil pitch comprises mainly saturated oils (43% by wet weight) and in a lower quantity aromatic oils (15% by wet weight), resins (21% by wet weight) and asphaltenes (21% by dry weight) and the second oil pitch comprises mainly aromatic oils (48% by wet weight) and resins (40% by wet weight) and in a lower content saturated oils (7% by wet weight) and asphaltenes (5% by dry weight). As it can be seen, the first and second oil pitches are chemically different from the bitumen. Surprisingly, the combination of these two oils allows to obtain a bitumen having the similar properties to bitumen from crude oil origin.

TABLE 1

| % | First oil pitch (% by weight) | Second oil pitch (% by weight) |
| --- | --- | --- |
| Saturated oils | 43 | 7 |
| Aromatic oils | 15 | 48 |
| Resins | 21 | 40 |
| Asphaltenes | 21 | 5 |

The combination of the first and second oil pitches creates a crystalline structure having the properties of a sol structure meaning that the obtained bitumen has the properties of a Newtonian liquid. This is advantageous to obtain a bitumen with a sol structure because it offers a large panel of application since it is more suitable for modifications. For example, the bitumen, with a sol structure, has such a viscosity that it can be modified by a polymer to form a bitumen having the properties of a viscoelastic fluid.

So, the particular choice of the first and the second oil pitches allows to obtain a bitumen where the first oil pitch acts synergistically with the second oil pitch. The presence of the first and the second oil pitches enables the creation of a crystalline structure which can be comparable to a bitumen from crude oil origin with a sol structure. For this reason, the bitumen according to the present invention is similar to a bitumen from crude oil origin in terms of physical properties.

The bitumen can therefore be used in several fields such as industry, mastics, buildings and waterproofing products, preferably waterproofing membranes.

The performance of a bitumen from crude oil origin or a bitumen of the present invention can preferably be estimated through several parameters such as the moment when the phase inversion occurs, the viscosity, the needle penetration, the ball-ring softening point, the ductility according to the force ductility method (NF EN 13589 standards).

The phase inversion is linked to the amount of the polymer added to the bitumen. The phase inversion occurs when the amount of the polymer is sufficient to create a polymeric matrix wherein the bitumen is retained.

The viscosity is an advantageous criterion because it allows to estimate if bitumen can be used in different field of technology such as in waterproofing products. The viscosity of bitumen is preferably comprised between 1500-30000 cps at 180° C., preferably 5000-15000 cps at 180° C., measured according to ASTM D2171 standard.

The needle penetration at 60° C. consists in measuring the hardness of bitumen under specified conditions. The indentation of bitumen in tenths of a millimeter (dmm) at 60° C. is measured by using a standard needle with a loading of 100 g during 5 second. The needle penetration at 60° C. is realised according to the ASTM D5 standard.

The ball-ring softening point is defined at the temperature at which the bitumen attains a specific consistency. According to the present invention, the ball-ring softening point has been measured at two temperatures. The first ball-ring softening point corresponds to the temperature at which the ball starts to pass through the ring and the second ball-ring softening point is measured according the NF EN 1427 or ASTM D36 standard.

The ductility of bitumen has been measured according to NF EN 13589 standard. The ductility measures the maximal force (N), the elongation at the maximal force (%), the elongation at break (%) and the work (J).

According to the present invention, the total amount of PAH's compounds is measured with a gas-chromatographic method coupled with mass spectrometric detection, according to NEN 7331 standard. The aforementioned method enables to determine the content of PAH's in the first oil pitch and in the second oil pitch of the present invention.

The first oil pitch of the present invention comprises a total amount of PAH's lower than 17 ppm. The PAH's compounds present in the first oil pitch are: naphthalene, anthracene, fluoranthene, benzo(a)anthracene, chrysene, benzo(k)fluoranthene, benzo(a)pyrene, benzo(g,h,i) perylene, indeno(1,2,3,c,d) pyrene and phenantrene.

The second oil pitch of the present invention comprises also the ten PAH's compounds present in the first oil pitch. The second oil pitch of the present invention comprises less than 8.4 ppm of PAH's.

An Latroscan® has been performed on a bitumen comprising the first oil pitch in an amount of 66% by wet weight and the second oil pitch in an amount of 33% by wet weight. The results of the Latroscan® are illustrated in table 2 which represents the amount of the SARA compounds in the bitumen. The bitumen in table 2 comprises 15.27% by wet weight of saturated oils, 52.24% by wet weight of aromatic oils, 16.28% by wet weight of resins and 16.21% by dry weight of asphaltenes. The bitumen of the present invention has a crystalline structure of a sol.

TABLE 2

| Compounds | Amount (% by weight) |
| --- | --- |
| Saturated oils | 15.27 |
| Aromatic oils | 52.24 |
| Resins | 16.28 |
| Asphaltenes | 16.21 |

EXAMPLE 1

The composition illustrated in table 3 contains the first (7.5% by wet weight) and second oil pitches (15% by wet weight) of the present invention to which a filler in an amount of 15% by dry weight, atactic polypropylene (APP) in a quantity of 10.5% by dry weight and a bituminous roof waste in an amount of 52% by dry weight have been added to the bitumen.

TABLE 3

| Compounds | Amount (% by weight) |
| --- | --- |
| CaCO$_3$ | 15 |
| APP | 10.5 |
| Bituminous roof waste | 52 |
| First oil pitch | 7.5 |
| Second oil pitch | 15 |

EXAMPLE 2

The present bitumen, illustrated in table 4, comprises the first oil pitch in an amount of 20% by wet weight and the second oil pitch in a quantity of 10% by wet weight of the present invention to which a bituminous roof waste has been added in an amount of 70% by dry weight.

TABLE 4

| Compounds | Amount (% by weight) |
| --- | --- |
| Bituminous roof waste | 70 |
| First oil pitch | 10 |
| Second oil pitch | 20 |

EXAMPLE 3

Table 5 represents a bitumen comprising the first oil pitch in a content of 20% by wet weight, the second oil pitch in an amount of 40% by wet weight, CaCO$_3$ (filler) in a quantity of 20% by dry weight and atactic polypropylene (APP) in an amount of 15% by dry weight.

TABLE 5

| Compounds | Amount (% by weight) |
| --- | --- |
| CaCO$_3$ | 20 |
| APP | 15 |
| First oil pitch | 20 |
| Second oil pitch | 45 |

EXAMPLE 4

Table 6 represents a known composition of bitumen and a bitumen of the present invention. The composition of bitumen from crude oil origin contains also APP. The bitumen of the present invention contains the first and the second oil pitches of the present invention and APP. The presence of APP is preferred to correctly compare the physical and chemical properties of the two bitumens.

As it can be seen from table 6, the phase inversion of the bitumen of the present invention occurs at 15% corresponding to the amount in dry weight of APP in the bitumen. The phase inversion of the composition containing bitumen from crude oil origin and APP occurs when 17% by dry weight of APP is added to the bitumen. The bitumen of the present invention enables to form a polymeric matrix wherein the bitumen is retained by adding APP in a lower amount with respect to the amount of APP in a composition of bitumen from crude oil origin.

The viscosity of the bitumen according to the present invention is equal to 1040 cps at 180° C. which corresponds to an adequate viscosity to use it for example, for manufacturing a waterproofing membrane.

The needle penetration at 60° C. and the balking softening point, the flexibility, the ductility, the lengthening and the elongation at break of the bitumen are similar to those of the composition of bitumen from crude oil origin. The flexibility according to the present invention is measured at the temperature at which the product obtained cracks.

According to table 6, the bitumen of the present invention has similar chemical and physical properties with bitumen from crude oil origin.

TABLE 6

|  | Bitumen | Bitumen of the present invention |
|---|---|---|
| Phase inversion (%) | 17 | 15 |
| Viscosity (cps) at 180° C. | 1485 | 1040 |
| Needle penetration at 60° C. (dmm) | >330 | 222 |
| Flexibility (° C.) | −32 | −26 |
| Ball-ring softening point (° C.) | 75/139 | 82/135 |
| Ductility |  |  |
| Maximal force (N) | 6 | 7 |
| Elongation at the maximal force (%) | 185 | 171 |
| Elongation at break (%) | 280 | 218 |
| Work (J) | 0.5 | 0.4 |

EXAMPLE 5

Table 7 illustrates four compositions: mix 1, mix 2, mix 3 and mix 4. Mix1 contains 70% by dry weight of a bituminous roof waste and 30% by wet weight of bitumen from crude oil origin. Mix2 contains 70% by dry weight of a bituminous roof waste and 30% by wet weight of the first oil pitch of the present invention. Mix3 is a bituminous composition containing a bituminous roof waste in an amount of 70% by dry weight and the second oil pitch of the present invention in an amount of 30% by wet weight. Mix4 is a bitumen according to the present invention which contains a bituminous roof waste in an amount of 70% by dry weight, the first oil pitch of the present invention in a quantity of 20% by wet weight and the second oil pitch of the present invention in a quantity of 10% by dry weight.

TABLE 7

|  | Mix1 | Mix2 | Mix3 | Mix4 |
|---|---|---|---|---|
| Bituminous roof waste (% by dry weight) | 70 | 70 | 70 | 70 |
| Bitumen from crude oil origin (% by wet weight) | 30 | 0 | 0 | 0 |
| First oil pitch (% by wet weight) | 0 | 30 | 0 | 20 |
| Second oil pitch (% by wet weight) | 0 | 0 | 30 | 10 |

Table 8 illustrates the properties of the compositions of mix1, mix2, mix3 and mix4 when APP is present in each composition. The presence of APP enables to have different compositions which can be comparable in term of physical and chemical properties. As it can be seen from table 8, the presence of the first and second oil pitches in the bitumen (mix4) allows to produce a bitumen having similar properties with bitumen from crude oil origin (mix1) and these properties can also be improved. For example, the phase inversion of mix 4 occurs at 9% corresponding to the amount by dry weight of APP in the bitumen. The phase inversion for the other composition occurs at 11% (by dry weight). This means that the bitumen of the present invention enables to integrate the bitumen in the polymeric matrix by adding a lower amount of APP in the bitumen with respect to the other compositions.

Moreover, table 8 illustrates also the viscosity of each composition. The viscosity, measured by ASTM D2171 standard, of mix2 (13020 cps, at 180° C.) and mix3 (7120 cps, at 180° C.) are not appropriate to be used for example, for the manufacturing of a waterproofing product. Mix4, the bitumen of the present invention, allows to obtain an adequate viscosity (5740 cps, at 180° C.) allowing to use it for example, for manufacturing a waterproofing membrane.

As it can be seen from table 8, the needle penetration, the flexibility, the ball-ring softening point, the ductility, the lengthening, lengthening and the elongation at break of mix 4 are similar to the one of mix 1.

These results show that the bitumen of the present invention has similar physical and chemical properties with bitumen from crude oil origin.

TABLE 8

|  | Mix1 | Mix2 | Mix3 | Mix4 |
|---|---|---|---|---|
| Phase inversion (%) | 11 | 11 | 11 | 9 |
| Viscosity at 180° C. | 6750 | 13020 | 7120 | 5740 |
| Needle penetration at 60° C. (dmm) | 105 | 222 | 108 | 149 |
| Flexibility (° C.) | −16 | −40 | 0 | −24 |
| Ball-ring softening point (° C.) | 125/141 | 118/142 | 133/146 | 133/149 |
| Ductility |  |  |  |  |
| Maximal force (N) | 29 | 18 | 73 | 22 |
| Elongation at the maximal force (%) | 26 | 31 | 17 | 26 |
| Elongation at break (N) | 55 | 52 | 35 | 79 |
| Work (J) | 0.4 | 0.2 | 0.6 | 0.4 |

COMPARATIVE EXAMPLE 1

Table 9 illustrates the results of Latroscan® process which has been performed on a composition of bitumen from crude oil origin. The bitumen comprises 11.14% by wet weight of saturated oils, 55.09% by wet weight of aromatic oils, 18.57% by wet weight of resins and 15.20% by dry weight of asphaltenes. According to the empiric relation allowing to define the type of the crystalline structure of a bitumen, the bitumen of the present comparative example has a sol structure since the amount of the aromatic oils and resins are higher to the amount of saturated oils and asphaltenes.

TABLE 9

| Bitumen | Amount (% by weight) |
|---|---|
| Saturated oils | 11.14 |
| Aromatic oils | 55.09 |
| Resins | 18.57 |
| Asphaltenes | 15.20 |

COMPARATIVE EXAMPLE 2

Table 10 represents the PAH's compounds which are present in a bitumen from crude oil origin. According to this embodiment, the bitumen has a total PAH's content of 34.44 ppm,

TABLE 10

| PAH's compounds | Amount in ppm (mg/kg) |
|---|---|
| Naphtalene | 3.8 |
| Anthracene | <1.16 |
| Fluoranthene | <1.16 |
| Benzo(a)anthracene | <1.16 |
| Chrysene | 6 |
| Benzo(k)fluoranthene | 7.7 |
| Benzo(a)pyrene | 4 |
| Benzo (g, h, i) perylene | 6.5 |
| Indeno (1, 2, 3, c, d) pyrene | <1.16 |
| Phenantrene | 1.8 |
| Total | 34.44 |

The invention claimed is:

1. A modified bitumen comprising
   a) a polymeric matrix having dispersed therein
   b) a bitumen having the properties of a Newtonian liquid and containing a mixture of (i) a first oil pitch comprising particles of soot and saturated oils at a content of at least 10% in wet weight, and (ii) a second oil pitch comprising aromatic oils at a content at least 10% in wet weight and resins, characterized in that the second oil pitch is a vacuum residue resulting from cracking, by combustion, crude oil and vacuum-distillation into several fractions, from which a bottom fraction forms the vacuum residue.

2. The modified bitumen according to claim 1, characterized in that the first oil pitch is present at a content of 15-75% by wet weight with respect to the total mass of said bitumen and the second oil pitch is present at a content of 85-25% by wet weight with respect to the total mass of said bitumen.

3. The modified bitumen according to claim 1, characterized in that said first oil pitch comprises at least 30% in wet weight of saturated oils, at least 10% in wet weight of aromatic oils, at least 15% in wet weight of resins and at least 15% in dry weight of asphaltenes, and said second oil pitch comprises at least 3% in wet weight of saturated oils, at least 35% in wet weight of aromatic oils, at least 30% in wet weight of resins and at least 2% in dry weight of asphaltenes.

4. The modified bitumen according to claim 1, wherein the bitumen further contains a bituminous roof waste in an amount between 0.5-70% in dry weight of the total mass of the bitumen, said bituminous roof waste comprising a first polymer in an amount between 0.5-30% in dry weight of the total mass of the bitumen.

5. The modified bitumen according to claim 4, wherein the bitumen further contains a second polymer in an amount between 0.5-30% in dry weight of the total mass of the bitumen.

6. The modified bitumen according to claim 5, wherein said first polymer and said second polymer are independently selected from the group consisting of atactic polypropylene (APP), poly(styrene-butadiene-styrene) (SBS) styrene-ethylene/butylene-styrene (SEBS), styrene-ethylene/propylene-styrene (SEPS), dimethyl-gamma-butyrolactone acrylate (DBA), styrene-isoprene-styrene (SIS), ethylene-vinyl acetate (EVA), isotactic polypropylene (IPP), syndiotactic polypropylene (SPP), and mixtures thereof.

7. The modified bitumen according to claim 1, wherein the bitumen further contains a filler selected from the group consisting of calcium carbonate and aluminate trihydrate (ATH).

8. The modified bitumen according to claim 7, wherein said filler is present in an amount in a range of 0.5-30% in dry weight of the total mass of the bitumen.

9. The modified bitumen according to claim 1, wherein the saturated oils are present at a content of at least 10% in wet weight, the aromatic oils are present at a content of at least 30% in wet weight, and the resins are present at a content of at least 10% in wet weight, and wherein the bitumen further contains asphaltenes at a content of at least 10% in dry weight.

10. The modified bitumen according to claim 1, wherein the bitumen further contains a bituminous roof waste in an amount between 0.5-70% in dry weight of the total mass of the bitumen, said bituminous roof waste comprising a first polymer in an amount between 2-20% in dry weight of the total mass of the bitumen.

11. The modified bitumen according to claim 10, wherein the bitumen further contains a second polymer in an amount between 2-20% in dry weight of the total mass of the bitumen.

12. The modified bitumen according to claim 1, wherein the bitumen further contains a bituminous roof waste in an amount between 0.5-70% in dry weight of the total mass of the bitumen, said bituminous roof waste comprising a first polymer in an amount between 10-15% in dry weight of the total mass of the bitumen.

13. The modified bitumen according to claim 12, wherein the bitumen further contains a second polymer in an amount between 10-15% in dry weight of the total mass of the bitumen.

14. The modified bitumen according to claim 7, wherein the calcium carbonate is colemanite.

* * * * *